United States Patent [19]

Kiehl et al.

[11] Patent Number: 5,008,017

[45] Date of Patent: Apr. 16, 1991

[54] METHOD FOR RECOVERING METALS FROM WASTE LIQUORS

[75] Inventors: Gary G. Kiehl, Hilton; Robert G. Surash, Rochester, both of N.Y.

[73] Assignee: Eastman Kodak Company, Rochester, N.Y.

[21] Appl. No.: 447,943

[22] Filed: Dec. 8, 1989

[51] Int. Cl.$^5$ .............................................. C02F 1/52
[52] U.S. Cl. ..................................... 210/710; 75/417; 75/635; 210/724; 210/751; 210/912; 423/35
[58] Field of Search ................. 75/417, 635; 210/702, 210/710, 711, 724, 726, 912, 751; 423/35

[56] References Cited

U.S. PATENT DOCUMENTS

| | | | |
|---|---|---|---|
| 2,131,045 | 9/1938 | Hickman et al. | 75/417 |
| 2,218,250 | 10/1940 | Reid | 75/635 |
| 3,429,693 | 2/1969 | Baver et al. | 423/53 |
| 3,929,466 | 12/1975 | Moyahan et al. | 75/635 |
| 3,960,550 | 6/1976 | Dusenberry | 75/417 |

FOREIGN PATENT DOCUMENTS 499201  1/1939  United Kingdom.

*Primary Examiner*—Peter Hruskoci
*Attorney, Agent, or Firm*—Robert A. Gerlach

[57] ABSTRACT

Waste liquors containing small amounts of silver salts are treated with aluminum hydroxide to produce a floc reduced in volume by the addition of an acid and mixed with a metal bicarbonate and metal carbonate in amounts sufficient to affect solidification.

8 Claims, No Drawings

METHOD FOR RECOVERING METALS FROM WASTE LIQUORS

BACKGROUND OF THE INVENTION

1. Field of the Invention

This invention relates to a method of recovering metals from waste liquors and more particularly to a method of recovering silver from solutions containing small amounts of silver or silver containing components.

2. Description of Related Art

British patent specification No 499201 teaches a method of recovering metals from waste liquids such as those containing ores or those waste liquids obtained in the photographic industry. According to the process of this patent specification, an alkaline solution containing the small portion of silver containing material is treated with aluminum sulfate in order to form an aluminum hydroxide floc that carries down the sludge as a precipitate and then the volume of the sludge is reduced by the addition of an acid. In working up the thus treated sludge, aluminum sulfate is recovered when sulfuric acid is used in the acid treatment. This method is one commonly employed for recovering silver from waste solutions and also for recovering silver from scrap film and paper which has previously been coated with silver salt containing emulsions.

A problem however has been encountered mainly in the recovery of silver from scrap film and scrap paper. Upon reducing the volume of the waste liquor by the addition of sulfuric acid the formation of a highly elastic residue is observed. Two problems are encountered in the further processing of these elastic residues. The first is that because of their elasticity they are difficult, if not impossible, to convey. Secondly, if they are employed in the next phase of the silver recovery process, which is customarily a roasting operation in order to drive off water and organic materials, they cause explosions.

While applicants do not wish to be bound by any theory with respect to the formation of these elastic residues, it is believed that they are due to the presence in the scrap film and paper of various complicated organic structures including the presence of photographic couplers and coupler solvents therefor. However, the formation of these elastic residues in the recovery of silver from photographic waste materials renders it necessary to provide a means for recovery of the silver contained therein which is not subject to either the formation of the elastic residues or the risk of explosion in the step of the process wherein water and organics are separated from the residue in roasters.

SUMMARY OF THE INVENTION

This invention provides a method of recovering silver from a waste liquor containing small concentrations of silver containing materials by treating the waste liquor with aluminum sulfate as a flocculating agent, reducing the volume of the silver bearing sludge thus formed by the addition of an acid wherein, subsequent to the step of treating with aluminum hydroxide, the waste liquor is mixed with a metal bicarbonate and metal carbonate. The total weight of the bicarbonate and carbonate employed is at least equal in parts by weight to that of the liquor being treated.

DESCRIPTION OF THE PREFERRED EMBODIMENTS

Thus, the invention is directed to a silver recovery process wherein a sludge is precipitated from a waste liquor by treatment with aluminum sulfate, the volume of the silver bearing sludge is reduced by treatment with an acid, wherein a metal bicarbonate and a metal carbonate are added to the liquor to form a suitable free flowing powder that can be readily conveyed and that does not cause explosion problems in subsequent heating steps, such as roasting normally used in recovering such waste materials. Preferably, sulfuric acid, is used in the volume reducing step because it regenerates aluminum sulfate which may then be subsequently used in treating an alkaline solution of the waste liquor. The total quantity of bicarbonate and carbonate used is in the amount of at least equal parts by weight as that of the waste liquor being treated. Preferably, the quantity of the two carbonates are employed in an amount of from one to three parts per part of waste liquor. Most preferably, two parts of the two carbonates per part of the waste liquor are employed. The two carbonates are utilized in a ratio of bicarbonate: carbonate of 1:3 to 3:1. Preferably, the two carbonates are employed in equal parts by weight.

The carbonate and bicarbonate employed in the process of this invention may be any of the metal carbonates and bicarbonates wherein the metal is a group Ia or IIa metal of the Periodic Chart of the Elements as published in the Ninth Edition of "The Merck Index". However, the carbonates an bicarbonates of sodium, potassium and calcium are preferred for economic reasons. Sodium carbonate and sodium bicarbonate are the most preferred materials.

While the bicarbonate and the carbonate may be added to the waste liquor in any order, it is preferred that the bicarbonate be added first and the carbonate second. However, the preferred technique for treating the waste liquor and particularly the elastic residue formed is to load a containerized batch mixer in layers where the bicarbonate and the carbonate are positioned on either side of the residue within the batch mixer. A batch mixer is a device wherein a cylindrical drum containing the ingredients to be mixed is rotated on a skewed axis in one direction while a breaker bar positioned within the cylindrical drum is rotated in the opposite direction causing the ingredients therein to be broken apart during the mixing operation. The apparatus used in accordance with this invention is manufactured by Lightnin Mixing Equipment Co., a unit of General Signal, Rochester, N.Y. 14619.

While the mixing operation with the two carbonates as described above is the preferred method of conducting the process in accordance with this invention, the waste liquor obtained directly from treating the initial waste material with aluminum sulfate may be treated with the bicarbonate and carbonate. However, this is not as suitable as the method described above in treating the elastic material as the opportunity is lost to reduce the volume by adding acid and to regenerate the aluminum sulfate. Further, higher quantities of the two carbonates must be employed on a weight basis because of the water present at this stage of the recovery process.

By practicing the preferred process of treating the elastic material, the residue is changed from that nature to a free flowing powder which may be suitably air-conveyed, even through pipes, if such is the desire. The powder thus formed may be utilized in a roasting apparatus such as a multiple hearth roaster or a rotary roaster in order to burn off the water and organic ingredients still present within the material. These roasters are operated any where from about 250° F. to about 1200° F. and generally from about 500° F. to 1000° F.. Subsequent to this operation the product thereof may be employed in a smelting operation in order to convert the silver containing compounds which are generally in the form of halides to pure silver. Such operations are well known in the art and require no further explanation here.

In treating waste solutions obtained from scrap photographic film and photographic paper in accordance with this invention, it may be desirable to conduct other procedures known in the art in order to obtain a waste liquor in suitable form for the practice of this invention. For example, in recovering silver from scrap material, the silver containing emulsion must first be removed from the film base and the gelatin of the emulsion degraded by any suitable technique such as, heating to a temperature greater than 100° F.. An enzyme is generally employed to break down the silver halide gelatin emulsion. Aluminum sulfate is added to the alkaline solution which forms aluminum hydroxide in situ which acts as a flocculating agent that brings down the solid matter in the form of a residue. Polymers are added to enhance the flocculating mechanism caused by the presence of aluminum hydroxide. A suitable flocculating enhancer is sold by the Dearborn Division, W. R. Grace & Co., Lake Zurich, IL 60047, Hackettstown, NJ 07840 under the name AQUAFLOC 408. Disinfectants are also employed for the purpose of killing bacteria present in the medium. The solids are separated in huge clarifers generally on the order of from about 100,000 to 500,000 gallon capacity. During this settling operation the ratio of water to the residue is approximately 9 to 1. The water is decanted off and the residue is reduced in volume by the addition of a suitable acid to reduce the volume of the residue. While any acid such as hydrochloric, nitric and the like may be employed, sulfuric acid is preferred since the added feature of aluminum sulfate regeneration occurs which can be separated from the residue and recycled for use in the flocculating step of the procedure. As stated above in the preferred embodiment, the residue may then be weighed out in order to determine the amount of the two carbonates to be employed in the step of the process in accordance with this invention. While it is preferred to utilize sodium carbonate and sodium bicarbonate in the practice of this invention, other carbonates and bicarbonates as mentioned above may be used.

In a specific preferred example of this invention, scrap color photographic film and paper in a water vehicle is adjusted to a pH of 7 to 9 by the addition of sodium hydroxide and heated to about 140° F. for about 1 hour by passing low pressure steam through the mass. Silver is present in this liquor in quantities on the order of 100 to 1000 parts per million, the water content being about 99.9% by weight. About 0.005 to about 0.03 percent by weight of a bacterial alkaline enzyme sold by Eastman Kodak Company under the trade designation KODASE PR 1000 is added. Heating at a temperature of greater than 100° F. is continued in order to remove the silver containing emulsion from the base support and to degrade the emulsion. 1 to 4 percent of aqueous aluminum sulfate containing from 1000 to 3000 parts per million of aluminum is added to the basic liquor thereby forming aluminum hydroxide floc. 0.5 parts per million of Dearborn AQUAFLOC 408 is added to enhance the flocculating effect of the aluminum sulfate. At this point, the constituency of the liquor is roughly 97 volume percent water and 3 percent solids. This liquor is next pH adjusted to between 6 and 8 and settled in large capacity clarifiers, the resulting material being about 90 volume percent water and 10 volume percent solids and having a mud-like appearance. The supernatant liquid is removed and the mud-like residue treated with sulfuric acid. The regenerated aluminum sulfate is recovered.

The resulting material is an elastic brownish-black gum. Analysis shows a high percentage presence of couplers and coupler solvents.

The residue is placed in a Lightnin Containerized Batch Mixer sandwiched between sodium bicarbonate and sodium carbonate, the three ingredients being in equal parts by weight. Mixing is continued for about 10 minutes. The material recovered is a coarse grain sand-like material.

This material is introduced into a Multiple Hearth Roaster where it is heated for a perioD of from about 30 minutes to about to 1 hour at 900° F. The resulting powder, free of organics, is a suitable raw material for smelting and the recovery of substantially pure silver.

What is claimed is:

1. In the method of recovering silver by (1) treating a waste liquor containing silver halide salts with aluminum sulfate as a flocculating agent to form a silver bearing sludge, and (2) reducing the volume of the silver bearing sludge by the addition of an acid, the improvement which comprises subsequent to step 1 mixing the silver bearing sludge with a metal bicarbonate and a metal carbonate, the weight ratio of bicarbonate to carbonate being from about $\frac{1}{3}$ to about 3/1, the total weight of bicarbonate and carbonate being from about 1 to about 3 parts per part of silver bearing sludge, wherein said silver bearing sludge is converted to a free flowing powder.

2. The method of claim 1 wherein the weight ratio of bicarbonate to carbonate is 1.

3. The method of claim 1 wherein the bicarbonate and carbonate is mixed with the silver bearing sludge after step (2).

4. The method of claim 1 wherein the metal of the carbonate and bicarbonate is a group Ia or IIa metal.

5. The method of claim 1 wherein the metal bicarbonate is sodium bicarbonate, potassium bicarbonate or calcium bicarbonate.

6. The method of claim 1 wherein the metal carbonate is sodium carbonate, potassium carbonate or calcium carbonate.

7. The method of claim 1 wherein the bicarbonate is sodium bicarbonate.

8. The method of claim 1 wherein the carbonate is sodium carbonate.

* * * * *